United States Patent Office 3,297,678
Patented Jan. 10, 1967

3,297,678
WATER-SOLUBLE AZO DYESTUFFS
Rudolf Kühne, Fritz Meininger, and Lothar Hörnig, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 25, 1963, Ser. No. 318,794
Claims priority, application Germany, Oct. 26, 1962, F 38.152
6 Claims. (Cl. 260—163)

The present invention relates to new water-soluble azo dyestuffs and a process for preparing them; more particularly the present invention relates to water-soluble azo dyestuffs of the following formulae

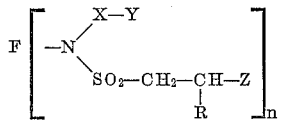

and

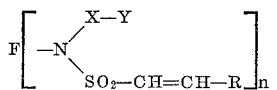

wherein F represents the radical of a mono- or disazo dyestuff molecule which may be substituted by groups imparting solubility in water, R represents a hydrogen atom or an alkyl group having 1 to 5 carbon atoms, Z represents an organic or inorganic acid radical, X represents a straight-chain or branched-chain alkylene group having 1 to 4 carbon atoms, Y represents a halogen atom or an oxygen, nitrogen- or sulfur-containing radical and $n$ stands for the integer 1 to 2.

We have found that new valuable water-soluble azo dyestuffs can be obtained by (a) coupling aromatic diazo-, diazoazo- or tetrazo compounds with coupling components, both components may contain groups imparting solubility in water, for example sulfonic acid or carboxylic acid groups, and at least one of the two components contains one or more groups of the following formulae

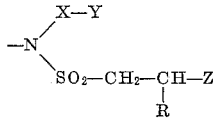 (1)

or

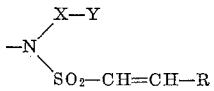 (2)

respectively, which may be linked directly or through a bivalent organic bridging member, for example an alkylene group, to an aromatic nucleus of the dyestuff molecule and wherein R represents a hydrogen atom or an alkyl group having 1 to 5 carbon atoms, Z represents an organic or inorganic acid radical, X represents a straight-chain or branched-chain alkylene group having 1 to 4 carbon atoms and y represents a halogen atom or an oxygen-, nitrogen- or sulfur-containing radical, or by (b) reacting water-soluble azo dyestuffs which contain at least one secondary amino group of the following formula

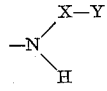 (3)

with an acylating agent introducing the group

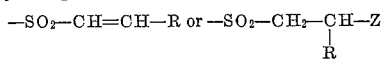

wherein X, Y, R and Z have the meanings given above, into the azo dyestuff molecule.

The number of the groups imparting solubility in water, such as sulfonic or carboxylic acid groups, which may possibly be present in the azo dyestuff molecule in addition to the characteristic groups (1) or (2), depends on the molecular weight of the dyestuff. If the molecular weight of the azo dyestuff is relatively low and if the group of the above Formulae 1 and 2 respectively, present in the molecule contains a group imparting solubility in water, it is not necessary that an additional group imparting solubility in water, for example a sulfonic or carboxylic acid group, be present. If, however, the dyestuff molecule contains only a group of Formula 2 in which Y is no group imparting solubility in water or a group of Formula 1 in which Z and Y are no groups imparting solubility in water, or if the dyestuff has a relatively high molecular weight, it is advantageous that the monoazo dyestuff contain, per azo group, at least two, and the disazo dyestuff at least three, of such additional groups imparting solubility in water to ensure an appropriate solubility in water.

As organic or inorganic acid radicals Z there may be mentioned, for example, the radicals —OSO$_3$H and —OOC—CH$_3$ and the halogens. As examples of oxygen-, nitrogen- or sulfur-containing radicals Y there may be named the groups —OH, —CN, —OSO$_3$H, —SO$_3$H, —COOH, —COO-alkyl,

—SO$_2$=alkyl, —CO—NH$_2$,—O=alkyl and—N(alkyl)$_2$.

Exemplary of suitable acylating agents introducing the group —SO$_2$—CH=CH—R or

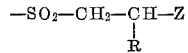

into the azo dyestuff molecule are carbyl sulfate, vinyl sulfonic acid chloride and β-chlorethane-sulfonic acid chloride.

The preparation of the new azo dyestuffs according to method (a) from diazo, diazoazo or tetrazo compounds and coupling components is carried out under the conditions usually applied for diazotization and coupling processes.

The reaction of water-soluble azo dyestuffs containing at least one group corresponding to Formula 3 with acylating agents according to method (b) may be carried out according to the processes known for the acylation of amino groups, for example, by a reaction of the said azo dyestuffs with vinyl sulfonic acid chloride or β-chlorethane-sulfonic acid chloride, dissolved in an organic solvent which is inert under the reaction conditions, for example dimethyl formamide, acetone, methylene chloride, benzene or toluene, in the presence of an acid-binding agent, for example sodium hydrogen carbonate, sodium acetate, an inert tertiary amine, for example dimethylamine triethylamine or pyridine, or by an addition reaction of carbyl sulfate with the secondary amino group (3) of the azo dyestuffs in water or in an inert organic solvent, for example nitrobenzene or ethylene chloride, at temperatures within the range of about 40° to 75° C., if desired in the presence of tertiary amines, for example triethylamine.

The compounds used as starting components according to method (a) may be prepared in the same manner by reacting the corresponding aromatic amines (diazo components) and coupling components, respectively, containing group (3) with the acylating agents in the above manner by condensation with splitting off of hydrogen halide or by an addition reaction.

Exemplary of diazo components to be used in the process of the invention and containing at least one of the above mentioned characteristic groups of Formula 1 or 2 are the following compounds and their alkali metal salts, respectively:

3-(N-β-cyanoethyl-N-ethionylamino)-1-aminobenzene,
4-(N-β-cyanoethyl-N-ethionlamino)-1-aminobenzene,
3-(N-β-cyanoethyl-N-ethionylamino)-4-methoxy-1-aminobenzene,
5-(N-β-chloroethyl-N-ethionylamino)-2-methyl-1-aminobenzene,
3-(N-β-chloroethyl-N-β'-chloroethylsulfonylamino-1-aminobenzene,
3-(N-β-cyanoethyl-N-vinylsulfonylamino)-1-aminobenzene,
3-(N-β-carboxyethyl-N-ethionylamino)-1-aminobenzene,
3-(N-β-carbethoxy-ethyl-N-ethionylamino)-1-aminobenzene,
4-(N-carbethoxy-methyl-N-ethionylamino)-1-aminobenzene,
5-(N-β-cyanoethyl-N-ethionylamino)-2-chloro-1-aminobenzene,
4-(N-β-cyanoethyl-N-ethionylamino)-6-amino-1,3-dimethylbenzene,
4-(N-β-cyanoethyl-N-ethionylamino)-2-amino-1-3-dimethylbenzene,
3-(N-β-hydroxyethyl-N-ethionylamino)-1-aminobenzene,
3-(N-β-hydroxyethyl-N-isethionylamino)-1-aminobenzene-disulfuric acid ester,
4-(N-β-chloroethyl-N-β-chloroethylsulfonylamino)-1-aminobenzene and compounds of the following formulae

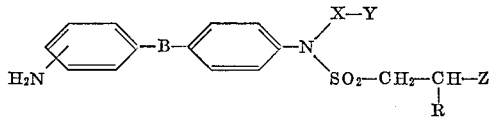  (5)

and

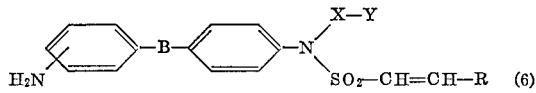  (6)

respectively, wherein R, X, Y and Z have the meanings given above and B is a direct linkage or a —CH₂—, —O—, —S—, —CO—, —NH—, —SO₂—, —CO—NH—, —SO₂—NH— or —N=N— bridging member.

If coupling components containing at least one group of Formula 1 or 2 are used, any desired primary aromatic diazotizable amines may be used as diazo components.

As coupling components there may be used all compounds of the benzene or naphthalene series that are capable of coupling owing to the presence of an amino group or an aromatically bound hydroxyl group. There may further be used pyrazolone, quinoline or 2-hydroxydiphenylene oxide or the derivatives thereof, or ketomethylene compounds that contain a methylene group that is capable of coupling in neighboring position to an enolizable keto group. Exemplary of such compounds are 4-methyl-1-hydroxybenzene,
4-acetylamino-1-hydroxybenzene,
1,3-dihydroxybenzene,
2,4-dihydroxybenzophenone,
hydroxynaphthalene,
2-hydroxy-7-benzoylamino-naphthalene,
2-hydroxynaphthalene-3-carboxylic acid-methyl ester,
2-hydroxynaphthalene-6-sulfonic acid amide,
dihydroxy-naphthalene,
arylamides of 2-3-hydroxynaphthoic acid,
1-phenyl-5-pyrazolone-3-carboxylic acid-amide,
1-phenyl-3-methyl-5-pyrazolone,
2-hydroxyquinoline,
2-hydroxycarbazole,
3-hydroxycarbazole,
2-hydroxydiphenylene oxide and the sulfonic acid or carboxylic acid group-containing derivatives of the above compounds.

Exemplary of coupling components containing a group (1) or (2) are 4-(N-β-cyanoethyl-N-ethionylamino)-1-acetoacetylaminobenzene, 6-(N-β-cyanoethyl-N-ethionylamino)-1-hydroxynaphthalene-3-sulfonic acid and compounds of the following formula

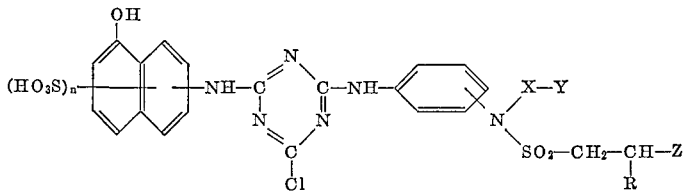

wherein R, X, Y and Z have the meanings given above and n stands for the integer 1 or 2.

The dyestuffs may also be prepared in a manner such that suitable groups are preformed in the dyestuff products and the groups of Formula 1 and 2 are finally formed only after the preparation of the dyestuffs. For example, by coupling diazotized 3-(N-β-chloroethyl-N-isethionylamino)-1-aminobenzene, with hydroxynaphthalene - 4 - sulfonic acid, a monoazo dyestuff can be obtained which does not yet contain the radical Z of the group of Formula 1. This radical can subsequently be introduced by esterification of the aliphatic hydroxyl group, for example by treatment with sulfuric acid.

Dyestuffs or initial dyestuff products containing group (2) in the molecule may also be obtained by treating suitable starting compounds containing a group of Formula 1 with an acid-binding agent such as sodium carbonate or sodium hydroxide, the acid radical Z being split off with the formation of a vinyl sulfonyl amino group substituted at the nitrogen atom.

The dyestuffs of the invention are suitable for use in the dyeing or printing of a wide variety of material, for example wool, silk, leather and linear polyamides. They are particularly suitable for producing dyeings and printings that are fast to washing or cellulose containing materials of fibrous structure, for example, regenerated cellulose and particularly cotton. The dyestuffs are applied to the cellulose fiber by treating the material with an aqueous solution of the dyestuff in the presence of an acid binding agent such as sodium hydroxide, sodium bicarbonate or trisodium phosphate, or by treating it with a printing paste in the presence of an acid-binding agent. In addition to acid-binding agents or substances capable of giving off acid-binding agents, the dyestuff solutions or printing pastes may contain urea, urethanes or water-soluble amides of aliphatic carboxylic acids, for example formamide, acetamide or malonic acid diamide. The treatment with the acid-binding agent may be carried out before, during or after the application of the dyestuff, if desired at elevated temperatures. The dyestuffs of the invention may also be used for printing mixed cellulose-polyester fabric. For this purpose, the textile material is printed with a printing paste containing an acid-binding agent, water-soluble amides of aliphatic carboxylic acids or water-soluble urethanes and a finely divided dispersion dye, dried and then exposed to the action of dry heat at a temperature of at least 100° C.

If the dyestuffs contain groups forming a metal complex, for example o,o'-dihydroxy-azo groups or hydroxycarboxy groups, the dyeings obtained may be after-treated in known manner with agents giving off metal. As such agents giving off metal there may be used those giving off chromium and advantageously those giving off nickel or copper.

The dyestuffs of the invention yield pure tints which are distinguished by good fastness properties to light and particularly by a very good fastness to washing.

As compared with the next comparable dyestuffs known, for example, from German Patent 1,107,356 and containing the group of the following formula

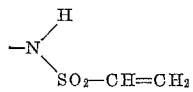

in the dyestuff molecule, the dyestuffs of the invention have the advantage that they enable considerably fuller dyeings and prints that can more easily be fixed to be obtained on cellulose fibers.

The following examples serve to illustrate the invention but they are not intended to limit it thereto, the parts being by weight unless otherwise stated and the relationship of parts by weight to parts by volume being the same as that of the kilogram to the liter.

*Example 1*

37.1 parts of the potassium salt of 3-(N-β-cyanoethyl-N-ethionylamino)-1-aminobenzene of the formula

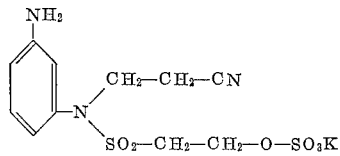

were dissolved in a mixture of 190 parts by volume of water and 50 parts of aqueous hydrochloric acid (d. 1.15). By slowly adding a 5 N solution of sodium nitrite, the said amine was diazotized at a temperature within the range of 0° to 5° C. When the diazotization was terminated a neutralized solution of 22.4 parts of 1-hydroxynaphthalene-4-sulfonic acid in 200 parts by volume of water was added to the solution of the diazo compound and the pH value was adjusted to 4.5 by adding sodium bicarbonate. When the coupling was complete, the dyestuff so obtained was salted out with potassium chloride, filtered off washed with dilute potassium chloride solution and finally dried in vacuo at a temperature within the range of 40° to 50° C.

A powder was obtained which dissolved in water with the appearance of an orange color. It dyed wool bright orange-red tints. By printing on cotton with a printing paste made of the dyestuff and containing also an alkali, for example sodium bicarbonate or trisodium phosphate and steaming at a temperature within the range of 100° to 105° C., orange-colored prints were obtained which were distinguished by very good fastness properties, particularly by a very good fastness to wet processing.

By using, instead of 22.4 parts of 1-hydroxynaphthalene-4-sulfonic acid, an equivalent amount of 1-(4'-sulfophenyl)-3-methyl-pyrazolone-(5), while otherwise proceeding as described above, a water-soluble yellow dyestuff was obtained which dyed cotton full yellow tints which were fast to boiling soda.

The 3-(N-β-cyanoethyl-ethionylamino)-1-aminobenzene used as the diazo component may be prepared in the following manner:

1-amino-3-nitrobenzene is condensed at 120° C. with acrylonitrile in the presence of glacial acetic acid and copper acetate to yield 3-(N-β-cyanoethylamino)-1-nitrobenzene melting at 97° C. and this compound is reacted with carbyl sulfate in nitrobenzene to yield 3-(N-β-cyanoethyl-N-ethionylamino)-1-nitrobenzene. (By subjecting the last-mentioned compound at room temperature to the action of dilute sodium hydroxide solution, 3-(N-β-cyanoethyl-N-vinylsulfonylamino)-1-nitrobenzene melting at 130° C. is obtained; by subjecting it to the action of dilute hydrochloric acid, 3-(N-β-cyanoethyl-N-β-hydroxyethylsulfonylamino)-1-nitrobenzene melting at 96° C.). By reducing the 3-(N-β-cyanoethyl-N-ethionylamino)-1-nitrobenzene with iron, 3-(N-β-cyanoethyl-N-ethionylamino)-1-aminobenzene is obtained.

*Example 2*

38.5 parts of the potassium salt of 5-(N-β-cyanoethyl-N-ethionylamino)-2-methyl-1-aminobenzene of the formula

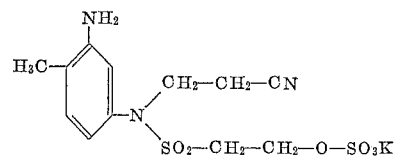

were dissolved in a mixture of 250 parts by volume of water and 60 parts of aqueous hydrochloric acid (d. 1.15) and diazotized with sodium nitrite. When the diazotization was terminated, the solution of the diazo compound was run into a solution of 30.4 parts of 1-naphthol-3,6-disulfonic acid in 210 parts by volume of water which had been neutralized with sodium hydroxide solution. Then the pH value was adjusted to 5.0 by the addition of sodium bicarbonate. When the coupling was complete, the dyestuff was salted out with potassium chloride, filtered off and dried at 60° C. in vacuo.

With the dyestuff so obtained a scarlet print of good fastness properties was obtained on cotton using the printing-steaming method.

When, instead of 30.4 parts of 1-naphthol-3,6-disulfonic acid, 25.4 parts of 1-(4'-sulfophenyl)-3-methylpyrazolone-(5) were used, while otherwise proceeding as described above, a yellow dyestuff was obtained which dyed cotton reddish yellow tints of very good fastness to washing.

The 5-(N-β-cyanoethyl-N-ethionylamino)-2-methyl-1-aminobenzene used as the diazo component may be prepared as follows: 5-nitro-2-methyl-1-aminobenzene melting a 79° C. is condensed at 120° C. with acrylonitrile in the presence of glacial acetic acid and copper acetate to obtain 4-(N-β-cyanoethylamino)-2-methyl-1-nitrobenzene melting at a temperature within the range of 83 to 85° C. By reacting the cyano compound so obtained with carbyl sulfate in nitrobenzene, 5-(N-cyanoethyl - N - ethionylamino) - 2 - methyl - 1 - nitrobenzene is obtained which is converted into 5-(N-β-cyanoethyl-N-ethionylamino)-2-methyl-1-aminobenzene by reduction with iron powder.

*Example 3*

37.1 parts of the potassium salt of 3-(N-β-cyanoethyl-N-ethionylamino)-1-aminobenzene of the formula

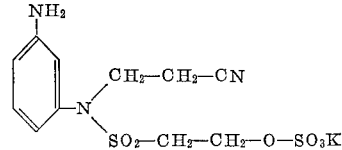

were diazotized in the manner described in Example 1. The diazo solution so obtained was run at a temperature within the range of 0° to 5° C. into a solution of 28.9 parts of 1-(2'-chloro-5'-sulfophenyl)-3-methyl-pyrazoline-(5), 12 parts of sodium carbonate and 5 parts of sodium hydroxide in 145 parts by volume of water. Then 35 parts of crystallized sodium acetate were added.

When the coupling was complete the dyestuff so obtained was salted out by the addition of potassium chloride, filtered off and dried at 50° C. in vacuo.

The yellow dyestuff powder which dissolved in water with a yellow color dyed silk yellow tints of good fastness properties.

Under the action of heat in the presence of sodium bicarbonate, the dyestuff yielded a yellow print on cotton which was fast to boiling soda.

The following table indicates the diazo and coupling components of further azo dyestuffs obtainable in a manner analogous to that described in Example 3 and the tints obtained with these dyestuffs on cotton.

| Diazo Component | Coupling Component | Tint on Cotton |
| --- | --- | --- |
| 3-(N-β-cyanoethyl-N-ethionylamino)-1-aminobenzene. | 1-hydroxy-6-acetylamino-naphthalene-3-sulfonic acid. | Orange. |
| 2-(N-β-cyanoethyl-N-ethionylamino)-1-aminobenzene. | 1-hydroxy-8-acetylamino-naphthalene-3,6-disulfonic acid. | Bluish red. |
| Do | 1-(4'-methyl-2'-sulfophenyl)-3-carboxypyrazolone-(5). | Greenish yellow. |
| Do | 1-(4'-sulfophenyl)-3-carboxy-5-pyrazolone. | Do. |
| 3-(N-β-cyanoethyl-N-ethionylamino)-1-aminobenzene. | 1-hydroxynaphthalene-5-sulfonic acid. | Red. |
| Do | 1-hydroxy-7-acetylamino-naphthalene-3-sulfonic acid. | Scarlet. |
| Do | 1-hydroxy-naphthalene-3,6-disulfonic acid. | Do. |
| Do | 1-hydroxy-8-acetylamino-naphthalene-3,6-disulfonic acid. | Bluish red. |

*Example 4*

25.1 parts of 3-(N-β-cyanoethyl-N-vinylsulfonylamino)-1-aminobenzene of the formula

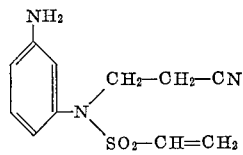

were dissolved in a mixture of 200 parts by volume of water, 50 parts by volume of acetone and 60 parts by volume of 5 N-hydrochloric acid an diazotized at a temperature within the range of 0° to 5° C. When the diazotization was terminated, the solution was adjusted to a pH value of 6 to 6.5 with sodium bicarbonate. Then a solution of 33.8 parts of 1-(2'-methyl - 6' - chloro - 4' - sulfophenyl) - 3 - methyl - pyrazolone - (5) and 16 parts of sodium hydroxide solution of 33 weight-percent strength in 110 parts by volume of water was run in at 10° C. After stirring for 1 hour, 28 parts of crystallized sodium acetate were added. When the coupling was complete, the dyestuff was isolated and dried.

A powder was obtained which dissolved in water with yellow color and which could be printed on cotton in the following manner: 20 parts of the dyestuff were dissolved with 50 parts of urea in 200 parts of hot water. The solution so obtained was mixed, while stirring, with 400 parts of a thickening consisting of 40 parts of sodium alginate and 960 parts of water and 20 parts of sodium bicarbonate. The paste was then made up to 1000 parts with water and thickening.

Cotton fabric was printed with the paste so obtained, dried, subjected for 5 minutes to steaming at a temperature of 101° to 103° C., rinsed with cold and then with hot water, soaped at the boil, rinsed again and dried. A yellow print of excellent fastness properties was obtained.

The 3 - (N - β - cyanoethyl - N - vinylsulfonylamino) - 1-aminobenzene used as the diazo component may be prepared as follows: 1-amino-3-nitrobenzene is condensed at 120° C. with acrylonitrile in the presence of glacial acetic acid and copper acetate to obtain 3-(N - β - cyanoethylamino) - 1 - nitrobenzene and the latter is reacted with carbyl sulfate in nitrobenzene to obtain 3 - (N - β - cyanoethyl - N - ethionylamino) - 1 - nitrobenzene. By reduction with iron this compound is converted into 3-(N - β - cyanoethyl - N - ethionylamino) - 1 - aminobenzene which is treated at room temperature with dilute sodium hydroxide solution to obtain the above mentioned diazo component melting at 75° to 77° C.

The following table indicates the diazo and coupling components of further azo dyestuffs obtainable in the manner described in Example 4 and the tints obtained therewith on cotton.

| Diazo Component | Coupling Component | Tint on Cotton |
| --- | --- | --- |
| 3-(N-β-cyanoethyl-N-vinylsulfonylamino)-1-aminobenzene. | 1-hydroxy-8-benzoylamino-naphthalene-3,5-disulfonic acid. | Bluish red. |
| 3-(N-β-cyanoethyl-N-vinylsulfony lamino)-1-aminobenzene. | 1-hydroxynaphthalene-4-sulfonic acid. | Scarlet. |
| Do | 1-hydroxy-6-acetylamino-naphthalene-3-sulfonic acid. | Orange. |

*Example 5*

A solution of 20.8 parts of the potassium salt of 3-(N-carbmethoxy - methyl - N - ethionylamino) - 1 - aminobenzene of the following formula

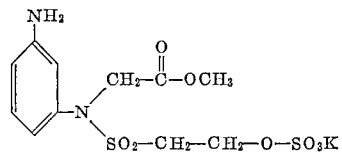

in 300 parts by volume of water was mixed with 80 parts by volume of 2 N-hydrochloric acid and diazotized at 5° C. When the diazotization was terminated, the diazonium salt solution was neutralized with sodium bicarbonate and combined with a solution of 15.2 parts of the sodium salt of 6-acetylamino - 1 - hydroxynaphthalene - 3 - sulfonic acid and 10 parts of crystallized sodium acetate in 100 parts by volume of water. When the coupling was complete, the dyestuff was isolated and dried at 40° C.

With the dyestuff so obtained cotton was printed according to the printing-steaming method, a bright orange print of very good fastness to washing being obtained.

The 3-(N - carbmethoxy - methyl-N-ethionylamino)-1-aminobenzene used as the diazo component may be prepared in the following manner: 3-(N - carbmethoxy - methylamino) - 1 - nitrobenzene melting at a temperature of 99 to 101° C. is reacted in nitrobenzene with carbyl sulfate to obtain 3 - (N - carbmethoxy - methyl - N - ethionylamino) - 1 - nitrobenzene. (By treating the compound at room temperature with dilute sodium hydroxide solution, 3 - (N - carbmethoxy - methyl - N - vinylsulfonylamino) - 1 - nitrobenzene melting at 104.5° C. and 3 - (N - carboxy - methyl - N - vinylsulfonylamino) - 1-nitrobenzene melting at 119° C. are obtained.) By catalytic reduction of the 3 - (N - carbmethoxy - methyl)-N - ethionylamino - 1 - nitrobenzene in the presence of Raney nickel, 3 - carbmethoxy - methyl - N - ethionylamino)-1-aminobenzene is obtained.

*Example 6*

21.0 parts of the potassium salt of 3 - (N - β - carbmethoxy-ethyl - N - ethionylamino) - 1 - aminobenzene of the following formula

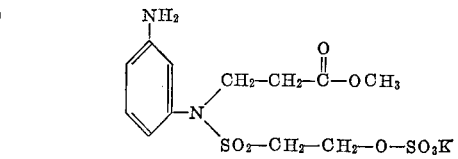

were dissolved in 220 parts by volume of water and then 20 parts by volume of concentrated aqueous hydrochloric acid were added. By the addition of a 5 N-solution of sodium nitrite at 0 to 5° C. the said amine was diazotized. When the diazotization was terminated, a neutralized solution of 12 parts 1 - hydroxynaphthalene - 4 - sulfonic acid in 150 parts by volume of water was run into the diazo solution and the pH value was adjusted to 4.5 by the addition of sodium bicarbonate. When the coupling was complete, the orange-red dyestuff was isolated and dried. The dyestuff had properties similar to those described in Example 1.

The 3-(N-β-carbmethoxy-ethyl-N-ethionylamino) - 1-aminobenzene used as the diazo component may be prepared as follows:

1-amino-3-nitrobenzene is condensed at 100° C. with acrylic acid methyl ester in the presence of catalytic amounts of glacial acetic acid and copper acetate to obtain 3-(N-β-carbmethoxy-ethylamino) - 1 - nitrobenzene melting at 86° to 87° C. (This compound may also be obtained by condensation of acrylic acid with 1-amino-3-nitrobenzene in the presence of copper acrylate at a temperature within the range of 100° to 120° C. or by saponification of 3-(N-β-cyanoethylamino)-1-nitrobenzene with sulfuric acid of 75% strength and subsequent esterification of the resulting 3-(N-β-carboxyethylamino)-1-nitrobenzene melting at 122° C. with methanol in the presence of sulfuric acid.) The ester so obtained is reacted with carbyl sulfate in nitrobenzene to obtain 3-(N-β-carbmethoxyethyl-N-ethionylamino) - 1 - nitrobenzene (melting point of the potassium salt 120° C. with decomposition). (By subjecting this compound at room temperature to the action of dilute sodium hydroxide solution, 3 - (N - β - carbmethoxyethyl-N-vinylsulfonyl-amino)-1-nitrobenzene melting at 45° C. is obtained; by subjecting it in the hot to the action of dilute hydrochloric acid, 3 - (N - β - carboxyethyl-N-β-hydroxyethylsulfonyl-amino)-1-nitrobenzene melting at 106° C. is obtained.) By catalytic reduction of the 3-(N-β-carbmethoxy-ethyl-N-ethionylamino)-1-nitrobenzene in the presence of Raney nickel, 3-(N-β-carbmethoxy-ethyl-N-ethionylamino) - 1-aminobenzene is obtained.

The following table indicates the diazo and coupling components of further azo dyestuffs obtainable in the manner described in Example 6 and the tints obtained therewith on cotton.

| Diazo Component | Coupling Component | Tint on Cotton |
| --- | --- | --- |
| 3-(N-β-carbmethoxy-ethyl-N-ethionylamino)-1-aminobenzene. | 1-hydroxy-6-acetylamino-naphthalene-3-sulfonic acid. | Orange. |
| Do | 1-hydroxy-8-acetylamino-naphthalene-3-sulfonic acid. | Bluish red. |
| 3-(N-carbmethoxy-methyl-N-ethionylamino)-1-amino-benzene. | 1-(4'-sulfophenyl)-pyrazolone-(5). | Yellow. |
| Do | 1-hydroxynaphthalene-4,8-disulfonic acid. | Reddish orange. |

*Example 7*

33.8 parts of the compound of the following formula

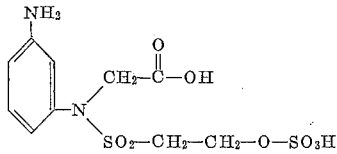

were diazotized in usual manner. The aqueous solution of the diazo compound so obtained was stirred at a temperature within the range of 0 to 10° C. into a solution of 23.5 parts of 1-hydroxynaphthalene-5-sulfonic acid and 4 parts of sodium hydroxide in 150 parts by volume of water. After the reaction mixture had been adjusted to a pH of 6.8 with sodium bicarbonate, it was saponified with 15 parts of crystallized sodium acetate and stirred until coupling was complete. The dyestuff so obtained was salted out with sodium chloride, filtered off and dried in vacuo at a temperature within the range of 50° to 60° C. The dyestuff dyed cotton and wool red tints of good fastness properties.

*Example 8*

A solution of 19.8 parts of the potassium salt of 4-(N-β-chloroethyl-N-ethionylamino)-1-aminobenzene of the following formula

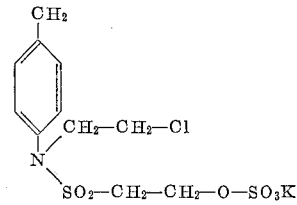

in 150 parts by volume of water and 30 parts by volume of 5 N-hydrochloric acid was diazotized at a temperature between 0° and 5° C. When the diazotization was terminated, the pH value of the solution was adjusted to 6 to 6.5 with sodium bicarbonate. Then a solution of 15.5 parts of 1-(2'-methyl-6'-chloro-4'-sulfophenyl)-3-methyl-pyrazolone-(5) and 7 parts of sodium hydroxide solution of 33 weight-percent strength in 70 parts by volume of water was run into the diazo solution and the reaction mixture was buffered by adding 17 parts of crystallized sodium acetate. When the coupling was complete, the dyestuff was isolated and dried at 50° C.

The brown-yellow dyestuff powder dissolved in water with a yellow color. It dyed wool and cotton yellow tints of good fastness properties.

When, instead of 19.8 parts of the potassium salt of 4-(N-β-chloroethyl-N-ethionylamino) - 1 - aminobenzene, 20.5 parts of the compound of the following formula

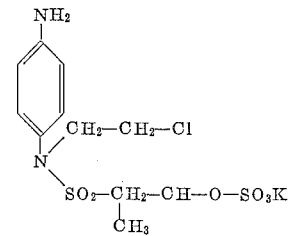

and, in another instance, 14.9 parts of the compound of the following formula

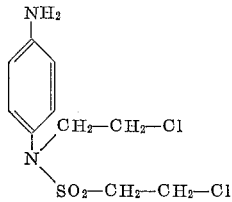

were used as the diazo component, while otherwise proceeding as described above, yellow dyestuffs of similar properties were obtained.

The 4-(N-β-chloroethyl-N-ethionylamino)-1-aminobenzene used as the diazo component may be prepared as follows: 1-chloro-4-nitrobenzene is reacted at 130° to 140° C. with ethanolamine in pyridine to obtain 4-(N-β-hydroxyethylamino)-1-nitrobenzene melting at 110° C. and the latter is subsequently converted with thionyl chloride in benzene into 4-(N-β-chloroethylamino)-1-nitrobenzene melting at 87° C. The last mentioned compound is then reacted with carbyl sulfate in nitrobenzene to obtain 4-(N-β-chloroethyl-N-ethionylamino)-1-nitrobenzene. By catalytic reduction in the presence of Raney nickel, the compound is converted into 4-(N-β-chloroethyl-N-ethionylamino)-1-aminobenzene.

Example 9

21.7 parts of the potassium salt of 3-(N-β-carbmethoxy-isopropyl-N-ethionylamino)-1-aminobenzene of the following formula

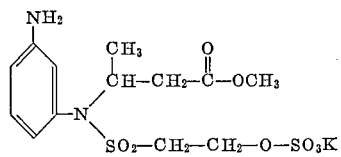

were diazotized in usual manner. To the diazo solution so obtained, 12.5 parts 7-amino-1-hydroxy-naphthalene-3-sulfonic acid and subsequently 33 parts of crystallized sodium acetate were added. The dyestuff so obtained was salted out with sodium chloride and isolated.

The dyestuff constituted a red powder which was readily soluble in water and dyed cotton and wool fast red tints.

The 3 - (N-β-carbmethoxyisopropyl-N-ethionylamino)-1-aminobenzene used as the diazo component may be prepared as follows: 1-amino-3-nitrobenzene is condensed at 110° C., with crotonic acid in the presence of catalytic amounts of glacial acetic acid to obtain 3-(N-β-carboxy-isopropylamino)-1-nitrobenzene melting at 124° C. and the carboxylic acid so obtained is esterified with methanol in the presence of sulfuric acid. The ester which has a melting point of 55° to 56° C. is reacted in nitrobenzene with carbyl sulfate to yield 3-(N-β-carbmethoxyisopropyl-N-ethionylamino)-1-nitrobenzene having a melting point of 175° to 178° C. (decomposition). By catalytic hydrogenation in the presence of Raney nickel 3-(N-β-carbmethoxyisopropyl - N-ethionylamino)-1-aminobenzene is obtained.

Example 10

20.8 parts of the potassium salt of 4-(N-carbmethoxymethyl-N-ethionylamino)-1-aminobenzene of the following formula

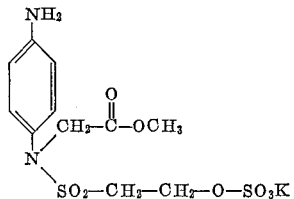

were diazotized in the manner described in Example 5. When the diazotization was terminated the diazonium salt solution was neutralized with sodium bicarbonate and combined with a solution of 13.0 parts of the sodium salt of 1-hydroxynaphthalene-4-sulfonic acid and 10 parts of crystallized sodium acetate in 100 parts by volume of water. When the coupling was complete, the red dyestuff so obtained was isolated and dried.

Dyeings could be prepared with the dyestuff by proceeding as follows: 83.5 parts of a viscose rayon fabric were treated, while being well moved, for 1 hour at 20° C. with 1000 parts by volume of a liquor containing 5 parts of the dyestuff, 50 parts of sodium sulfate and 10 parts of sodium hydroxide. The fabric was then rinsed at the boil and dried. A bright scarlet dyeing of very good fastness to washing was obtained.

The 4 - (N - carbmethoxymethyl-N-ethionylamino)-1-aminobenzene used as the diazo component may be prepared as follows: 4-(N-carbmethoxymethylamino)-1-nitrobenzene melting at 177° C. is reacted with carbyl sulfate in nitrobenzene to obtain 4-(N-carbmethoxymethyl-N-ethionylamino)-1-nitrobenzene which is converted into 4 - (N - carbmethoxymethyl-N-ethionylamino)-1-aminobenzene by catalytic hydrogenation in the presence of Raney nickel.

Example 11

20.7 parts of the potassium salt of 4-(N-β-cyanoethyl-N - ethionylamino) - 6-amino-1,3-dimethylbenzene of the following formula

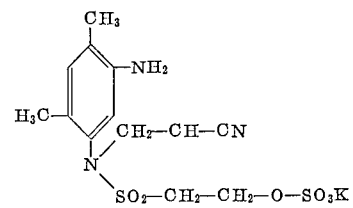

were diazotized in usual manner, coupled with 1-hydroxy-naphthalene-4-sulfonic acid as described in Example 10 and isolated. The dyestuff so obtained constituted a red powder.

The dyestuff could be thermofixed on cellulose fabric by proceeding as follows: 20 parts of the dyestuff were dissolved with 50 parts of urea in 200 parts of hot water. To the solution so obtained 400 parts of an aqueous alginate thickening of 8 weight-percent strength which was resistant to alkalies and 20 parts of sodium bicarbonate were added, while stirring. The mixture was made up to 1000 parts with water and thickening. With the paste so obtained prints were produced on cellulose fabric. The dyestuff was fixed by subjecting the printed fabric for 3 minutes to a dry heat-treatment at 140° C. By soaping at the boil and rinsing a bright scarlet print of very good fastness to washing was obtained.

The compound used as the diazo component may be prepared as follows: 6-nitro-4-amino-1,3-dimethylbenzene melting at a temperature of 123° to 124° C. is reacted with acrylonitrile to obtain 4-(N-β-cyanoethylamino)-6-nitro-1,3-xylene melting at 107.5° C. and the latter is reacted with carbyl sulfate to obtain 4-(N-β-cyanoethyl-N - ethionylamino)-6-nitro-1,3-dimethylbenzene. By reducing this compound in the presence of iron, 4-(N-β-cyanoethyl - N - ethionylamino) - 6-amino-1,3-dimethylbenzene is obtained.

When, instead of 20.7 parts of the potassium salt of 4 - (N - β-cyanoethyl-N-ethionylamino)-6-amino-1,3-dimethylbenzene, the same amount of the potassium salt of 4 - (N - β - cyanoethyl-N-ethionylamino)-2-amino-1,3-dimethylbenzene was used, while otherwise proceeding as described above, a yellowish red dyestuff of similar good properties was obtained.

The 4-(N-β-cyanoethyl-N-ethionylamino)-2-amino-1,3-dimethylbenzene used as the diazo component may be prepared in the following manner: 2-nitro-4-amino-1,3-dimethylbenzene melting at 78° C. is reacted with acrylonitrile to obtain 4-(N-β-cyanoethylamino)-2-nitro-1,3-dimethylbenzene melting at 114° C. which is converted into 4 - (N - β-cyanoethyl-N-ethionylamino)-2-nitro-1,3-dimethylbenzene by reacting with carbyl sulfate. By reduction in the presence of iron powder, 4-(N-β-cyanoethyl - N - ethionylamino)-2-amino-1,3-dimethylbenzene is obtained. (4 - (N - β-cyanoethyl-N-ethionylamino)-6-amino-1,3-dimethylbenzene can be prepared in analogous manner.)

Example 12

18 parts of 8-amino-1-hydroxynaphthalene-3,6-disulfonic acid were dissolved in 200 parts by volume of water and 4 parts by volume of sodium hydroxide solution of 33 weight-percent strength and combined with a mixture of 70 parts of ice, 30 parts by volume of 2 N-hydrochloric acid and 200 parts by volume of water. The solution so obtained was mixed with a diazonium salt solution obtained by diazotizing 19.6 parts of 4-chloro-3-(N-β-cyanoethyl-N-ethionylamino)-1-aminobenzene of the following formula

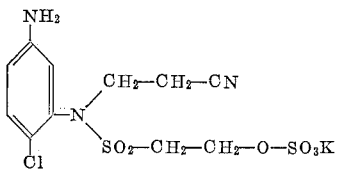

The reaction mixture was maintained at a pH of about 2 by the addition of sodium acetate.

5.3 parts of aminobenzene were diazotized in known manner in a mixture of 60 parts by volume of water and 14 parts of aqueous hydrochloric acid. When the diazotization was terminated, the solution of the diazonium compound was combined with the solution of the monoazo dyestuff prepared as described above and having the following formula

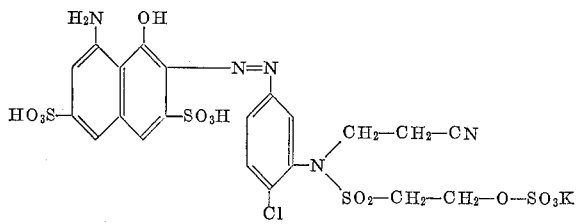

By the addition of sodium carbonate the pH value was adjusted to 6 to 6.5. When the coupling was complete the disazo dyestuff obtained was isolated by salting out with potassium chloride and subsequent filtration.

The disazo dyestuff so obtained dyed wool blue-black to black tints.

The 4-chloro-3-(N-β-cyanoethyl-N-ethionylamino)-1-aminobenzene used as the diazo component may be prepared as follows: 4-chloro-3-amino-1-nitrobenzene is reacted with acrylonitrile to obtain 4-chloro-3-(N-β-cyanoethylamino)-1-nitrobenzene which is reacted with carbyl sulfate to obtain 4-chloro-3-(N-β-cyanoethyl-N-ethionylamino)-1-nitrobenzene. The latter is reduced in the presence of iron to obtain 4-chloro-3-(N-β-cyanoethyl-N-ethionylamino)-1-aminobenzene.

The following table indicates the diazo and coupling components of further disazo dyestuffs which can be obtained in a manner analogous to that described in this example and the tints obtained therewith on cotton.

| Diazo Components | Coupling Component | Tint on Cotton |
|---|---|---|
| Aminobenzene, (N-4-carbmethoxymethyl-N-ethionylamino)-1-aminobenzene. | 1-hydroxy-8-amino-naphthalene-3,6-disulfonic acid. | Bluish black. |
| 4-(N-β-chloroethyl-N-ethionylamino)-1-aminobenzene, aminobenzene-2-sulfonic acid. | 1-hydroxy-8-amino-naphthalene-3,6-disulfonic acid. | Do. |
| 4-(N-β-chloroethyl-N-ethionyl amino)-1-aminobenzene, 4-(N-β-chloroethyl-N-ethionylamino)-aminobenzene. | -----do----- | Do. |
| 1-amino-4-nitrobenzene, 4-(N-carbmethoxymethyl-N-vinyl-sulfonylamino)-1-aminobenzene. | -----do----- | Do. |

*Example 13*

10.1 parts of the potassium salt of 4-(N-β-cyanoethyl-N-ethionylamino)-1-(4'-aminobenzoylamino)-benzene of the following formula

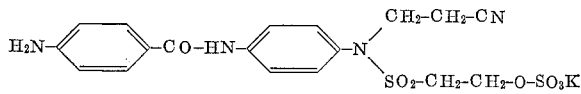

were dissolved in a mixture of 300 parts by volume of water, 50 parts of ice and 60 parts by volume of 2 N-hydrochloric acid and diazotized with sodium nitrite. To the diazo solution so obtained 9 parts of 8-acetylamino-1-hydroxynaphthalene-3,6-disulfonic acid were added. Subsequently sodium carbonate was introduced until a pH of 5.5 was obtained. The dyestuff was salted out with sodium chloride, filtered off and dried in vacuo at 50° C. A red powder was obtained which dissolved readily in water with a red color. In the presence of acid binding agents such as sodium bicarbonate and sodium carbonate the dyestuff dyed cotton from baths containing salt red tints of very good wet fastness properties.

The 4-(N-β-cyanoethyl-N-ethionylamino)-1-(4'-aminobenzolamino)-benzene used as the diazo component may be prepared as follows: 1-amino-4-nitrobenzene is condensed at a temperature within the range of 120° to 140° C. with acrylonitrile in the presence of glacial acetic acid and copper acetate to obtain 4-(N-β-cyanoethylamino)-1-nitrobenzene melting at a temperature of 128° to 130° C. and this compound is converted with carbyl sulfate in nitrobenzene into 4-(N-β-cyanoethyl-N-ethionylamino)-1-nitrobenzene. By reducing the latter with iron, 4-(N-β-cyanoethyl-N-ethionylamino)-1-aminobenzene is obtained which is reacted with 4-nitrobenzoylchloride to obtain 4-(N-β-cyanoethyl-N-ethionylamino)-1-(4'-nitrobenzoylamino)-benzene. The latter is reduced to obtain 4-(N-β-cyanoethyl-N-ethionylamino)-1-(4'-aminobenzoylamino)-benzene in the form of a colorless powder.

The following table indicates the diazo and coupling components of further azo dyestuffs which can be obtained in an analogous manner and the tints obtained therewith on cotton.

| Diazo Component | Coupling Component | Tint on Cotton |
|---|---|---|
| 4-(N-β-cyanoethyl-N-ethionylamino)-1-(4'-aminobenzoylamino)-benzene. | 1-(2'-chloro-5'-sulfo-phenyl)-3-methylpyrazolone-(5). | Yellow. |
| 4-(N-β-cyanoethyl-N-ethionylamino)-1-(4'-aminobenzoylamino)-benzene. | 1-hydroxy-7-acetylamino-naphthalene-3-sulfonic acid. | Red. |
| 3-(N-β-cyanoethyl-N-ethionylamino)-1-(3'-aminobenzoylamino)-benzene. | 1-hydroxy-8-acetylamino-naphthalene-3,6-disulfonic acid. | Red. |
| 4-(N-β-cyanoethyl-N-ethionylamino)-1-(4'-aminosulfonylamino)-benzene. | 1-hydroxynaphthalene-4-sulfonic acid. | Yellowish red. |

*Example 14*

5.6 parts of 1-aminobenzene-2,5-disulfonic acid were dissolved in a mixture of 20 parts by volume of water, 18 parts by volume of sodium carbonate solution of 10 weight-percent strength and 4 parts by volume of a 5 N-solution of sodium nitrite and added to a mixture of 50 parts by volume of 2 N-hydrochloric acid and 100 parts of ice. To the diazo solution so obtained 10 parts of the sodium salt of 1-(2'-3'-hydroxynaphthoylamino)-3-(N - carbmethoxymethyl-N-ethionylamino)-benzene of the following formula

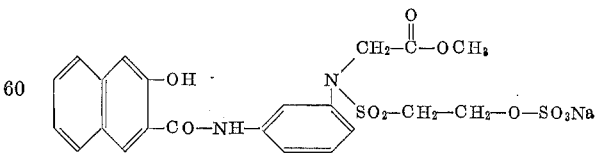

were added and subsequently 16 parts of crystallized sodium acetate and 3 parts of sodium carbonate were introduced. When the coupling was complete the dyestuff was salted out with potassium chloride and isolated.

The dyestuff constituted a red-orange powder which yielded orange prints of good fastness to washing on cotton.

The 1-(2'-hydroxy-3'-naphthoylamino)-3-(N-carbmethoxymethyl-N-ethionylamino)-benzene used as the diazo component may be prepared by condensation of 2-hydroxynaphthalene-3-carboxylic acid chloride with 3-(N-carbmethoxymethyl-N-ethionylamino)-1-aminobenzene.

Example 15

To a mixture of 18.6 parts of cyanuric chloride, 150 parts by volume of acetone and 200 parts by volume of water a neutral solution of 31.9 parts of 1-hydroxy-8-aminonaphthalene-3,6-disulfonic acid in 200 parts by volume of an aqueous potassium hydroxide solution of about 10 weight-percent strength was added at 0° to 5° C. Subsequently a neutral solution of 38.7 parts of the potassium salt of 3-(N-β-cyanoethyl-N-ethionylamino)-1-aminobenzene in 230 parts by volume of water was run in at 10° to 50° C. By simultaneously adding 1 N-KOH the pH was maintained between 5 and 6 during both condensations.

17.3 parts of 2-aminobenzene sulfonic acid were dissolved in 100 parts by volume of water and 45 parts by volume of 5 N-hydrochloric acid and diazotized at a temperature within the range of 0° to 5° C. by slowly adding 20 parts by volume of a 5 N solution of sodium nitrite. When the diazotization was terminated, the pH was adjusted to 4.5 by adding potassium bicarbonate and the diazo solution was combined at 10° C. with the condensation solution obtained as described above. The pH was adjusted to 6.5 by the addition of potassium bicarbonate. When the coupling was complete the dyestuff formed was salted out with potassium chloride, filtered, washed with saturated potassium chloride solution and dried at 40° to 50° C. in vacuo.

The dyestuff so obtained dissolved in water with a red color. It yielded bright bluish red prints of very good wet fastness properties on cotton.

The following table indicates the condensation components with cyanuric chloride and the diazo components of further azo dyestuffs obtainable in analogous manner and the tints obtained therewith on cotton.

| 1st Condensation Component | 2nd Condensation Component | Diazo Component | Tint on Cotton |
|---|---|---|---|
| 1-hydroxy-7-amino-naphthalene-3-sulfonic acid. | 3-(N-β-cyanoethyl-N-vinylsulfonylamino)-1-aminobenzene. | 2-aminobenzene sulfonic acid. | Scarlet. |
| 1-hydroxy-6-amino-naphthalene-3-sulfonic acid. | 3-(N-β-cyanoethyl-N-ethionylamino)-1-aminobenzene. | 1-amino-naphthalene-2,5-disulfonic acid. | Golden yellow. |
| 1-hydroxy-8-amino-naphthalene-3,6-disulfonic acid. | ....do.................... | Aniline................ | Bluish red. |

Example 16

22.3 parts of the dyestuff of the following formula

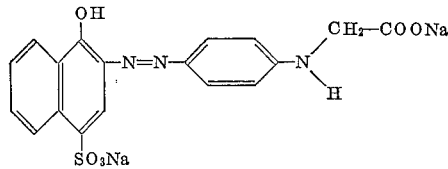

(obtainable by coupling diazotized 4-(N-carbmethoxymethyl-N-acetylamino)-1-aminobenzene with 1-hydroxynaphthalene-4-sulfonic acid and subsequent saponification of the coupled product with dilute hydrochloric acid) were dissolved in 350 parts by volume of water and cooled to a temperature of 0° to 5° C. At that temperature a mixture of 15 parts of β-acetoxyethane sulfochloride and 70 parts by volume of acetone was slowly run in, while stirring vigorously. By the simultaneous addition of sodium hydrogen carbonate the pH was maintained within the range of 5.5 to 6.5. The mixture was then stirred at 20° C. until the conversion was complete. The acylated dyestuff was isolated. A red powder was obtained which yielded scarlet prints of very good fastness to washing on cotton.

We claim:
1. A compound of the group consisting of compounds of the formulae

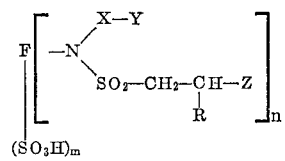

and

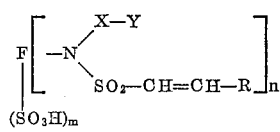

wherein F represents a monoazo or disazo dyestuff molecule containing at least one benzene ring and a naphthol or pyrazolone group, the reactive group shown within the brackets being connected directly to a benzene ring, R represents a member of the group consisting of a hydrogen atom and an alkyl group having 1 to 5 carbon atoms, X represents a member of the group consisting of an alkylene group having 1 to 4 carbon atoms and an alkylene group having 1 to 4 carbon atoms substituted by a lower alkyl group, Y represents a member of the group consisting of a cyano group, a carbomethoxy group, a carboxylic acid group and chlorine, Z represents a member of the group consisting of —O—SO$_3$H, —OOCCH$_3$ and chlorine, $n$ stands for one of the integers 1 and 2 and $m$ stands for one of the integers 1 to 4.

2. The compound of the formula

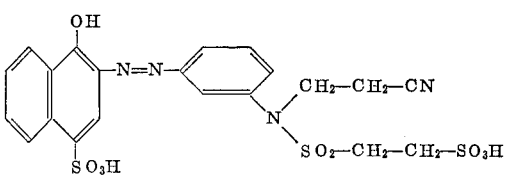

3. The compound of the formula

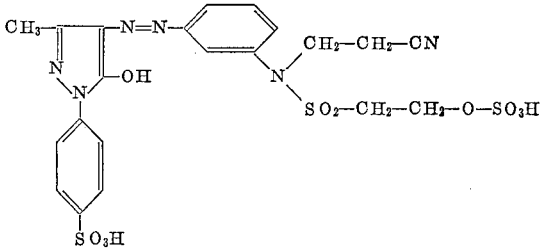

4. The compound of the formula
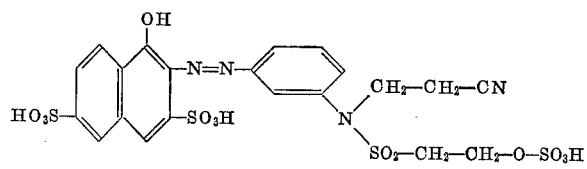
5. The compound of the formula
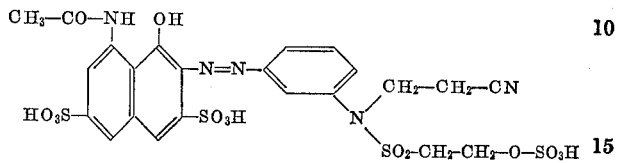
6. The compound of the formula
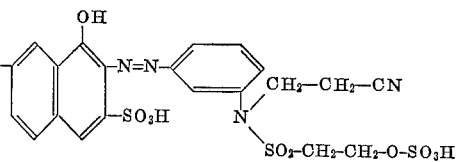
No references cited.
CHARLES B. PARKER, *Primary Examiner.*
F. D. HIGEL, *Assistant Examiner.*